United States Patent
Zhou et al.

(10) Patent No.: US 10,109,219 B2
(45) Date of Patent: Oct. 23, 2018

(54) SYSTEM AND METHOD FOR AUTOMATED SIGN LANGUAGE RECOGNITION

(71) Applicant: Robert Bosch GmbH, Stuttgart (DE)

(72) Inventors: Zhengyu Zhou, Fremont, CA (US); Tobias Menne, Halvar (DE); Kehuang Li, Atlanta, GA (US); Kui Xu, Sunnyvale, CA (US); Zhe Feng, Mountain View, CA (US); Chin-Hui Lee, Atlanta, GA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/099,628

(22) Filed: Apr. 15, 2016

(65) Prior Publication Data
US 2016/0307469 A1    Oct. 20, 2016

Related U.S. Application Data

(60) Provisional application No. 62/148,204, filed on Apr. 16, 2015, provisional application No. 62/173,878, filed on Jun. 10, 2015.

(51) Int. Cl.
*G09B 21/00* (2006.01)
*G06F 3/01* (2006.01)
(Continued)

(52) U.S. Cl.
CPC .......... *G09B 21/009* (2013.01); *G06F 3/014* (2013.01); *G06K 9/00355* (2013.01); *G06K 9/6217* (2013.01); *G06K 9/6297* (2013.01)

(58) Field of Classification Search
CPC ............... G06K 9/6217; G06K 9/6297; G06K 9/00355; G06F 3/014; G09B 21/009
See application file for complete search history.

(56) References Cited

U.S. PATENT DOCUMENTS 4,653,107 A * 3/1987 Shojima ............. G06K 9/00402
382/189
5,737,593 A * 4/1998 Agrawal ........... G06F 17/30327
(Continued)

FOREIGN PATENT DOCUMENTS

WO    2009055148 A1    4/2009

OTHER PUBLICATIONS

Ren et al. "Robust Hand Gesture Recognition with Kinect Sensor" ACM (12/11) pp. 759-760.*
(Continued)

*Primary Examiner* — Mia M Thomas
(74) *Attorney, Agent, or Firm* — Maginot Moore & Beck LLP

(57) ABSTRACT

A method for sign language recognition includes receiving, with an input device, an input based on a plurality of hand movements and postures of a user that correspond to a sequence of signs, extracting a plurality of features from the input corresponding to the plurality of hand movements and postures, identifying, a start of the sequence of signs in the input based on a first set of features in the plurality of features and a first Hidden Markov Model (HMM) stored in the memory and identifying a first sign in the input based on a second set of features in the plurality of features and a second HMM stored in the memory. The method also includes generating an output corresponding to the first sign from the input.

13 Claims, 9 Drawing Sheets

(51) Int. Cl.
*G06K 9/62* (2006.01)
*G06K 9/00* (2006.01)

(56) References Cited

U.S. PATENT DOCUMENTS

| | | | | |
|---|---|---|---|---|
| 5,917,941 | A * | 6/1999 | Webb | G06K 9/00879 382/177 |
| 5,956,419 | A * | 9/1999 | Kopec | G06K 9/6256 345/467 |
| 6,788,809 | B1 * | 9/2004 | Grzeszczuk | G06F 3/017 345/419 |
| 6,917,693 | B1 * | 7/2005 | Kiridena | B60R 1/00 348/E7.086 |
| 7,092,870 | B1 * | 8/2006 | Chen | G06F 17/2755 382/181 |
| 7,426,301 | B2 * | 9/2008 | Porikli | G06K 9/00335 382/181 |
| 7,565,295 | B1 * | 7/2009 | Hernandez-Rebollar | G06K 9/00355 382/182 |
| 7,974,843 | B2 * | 7/2011 | Schneider | G10L 15/005 704/251 |
| 8,005,263 | B2 * | 8/2011 | Fujimura | G06F 3/017 379/52 |
| 8,150,160 | B2 * | 4/2012 | Al-Muhtaseb | G06K 9/6297 382/185 |
| 8,352,265 | B1 * | 1/2013 | Lin | G10L 15/142 704/256 |
| 8,787,638 | B2 * | 7/2014 | Zee | A61B 3/12 382/128 |
| 8,811,701 | B2 * | 8/2014 | Khurd | G06K 9/6226 382/128 |
| 8,885,882 | B1 * | 11/2014 | Yin | G06F 3/00 382/103 |
| 8,971,572 | B1 * | 3/2015 | Yin | G06K 9/00355 345/173 |
| 9,189,068 | B2 * | 11/2015 | Im | G06F 3/005 |
| 9,323,337 | B2 * | 4/2016 | Zhou | G06K 9/00355 |
| 9,335,826 | B2 * | 5/2016 | Cheng | G06F 3/0233 |
| 9,372,544 | B2 * | 6/2016 | Kim | G06F 3/011 |
| 9,417,693 | B2 * | 8/2016 | Seth | |
| 9,483,692 | B2 * | 11/2016 | Kondou | G06F 3/017 |
| 9,524,032 | B2 * | 12/2016 | Rosenstock | B60K 37/06 |
| 9,536,135 | B2 * | 1/2017 | Zhang | G06K 9/00355 |
| 9,552,070 | B2 * | 1/2017 | Shotton | G06F 3/017 |
| 9,632,658 | B2 * | 4/2017 | Holz | G06F 3/017 |
| 9,836,620 | B2 * | 12/2017 | Jin | G06F 21/6245 |
| 2004/0002838 | A1 | 1/2004 | Oliver et al. | |
| 2005/0033575 | A1 * | 2/2005 | Schneider | G10L 15/005 704/254 |
| 2005/0256817 | A1 | 11/2005 | Wren et al. | |
| 2006/0047386 | A1 * | 3/2006 | Kanevsky | B60K 35/00 701/36 |
| 2006/0085115 | A1 * | 4/2006 | Ilan | B60R 16/0373 701/49 |
| 2008/0120108 | A1 * | 5/2008 | Soong | G06K 9/00 704/254 |
| 2009/0110292 | A1 * | 4/2009 | Fujimura | G06F 3/017 382/203 |
| 2009/0136136 | A1 * | 5/2009 | Mori | G06K 9/00416 382/187 |
| 2009/0278915 | A1 * | 11/2009 | Kramer | G06F 3/017 348/48 |
| 2010/0023314 | A1 * | 1/2010 | Hernandez-Rebollar | G06F 3/014 704/3 |
| 2010/0074537 | A1 * | 3/2010 | Hua | G06K 9/6297 382/224 |
| 2010/0246963 | A1 * | 9/2010 | Al-Muhtaseb | G06K 9/6297 382/185 |
| 2011/0050589 | A1 * | 3/2011 | Yan | B60K 37/06 345/173 |
| 2011/0254765 | A1 * | 10/2011 | Brand | G06F 3/017 345/158 |
| 2011/0301934 | A1 | 12/2011 | Tardif | |
| 2012/0105613 | A1 * | 5/2012 | Weng | G01C 21/3664 348/77 |
| 2012/0144554 | A1 * | 6/2012 | Thellmann | A63B 21/065 2/161.1 |
| 2013/0082922 | A1 * | 4/2013 | Miller | G06F 3/017 345/156 |
| 2013/0236089 | A1 * | 9/2013 | Litvak | G06K 9/00382 382/154 |
| 2013/0278501 | A1 * | 10/2013 | Bulzacki | G06F 3/017 345/157 |
| 2013/0294651 | A1 | 11/2013 | Zhou et al. | |
| 2013/0336524 | A1 * | 12/2013 | Zhang | G06K 9/00355 382/103 |
| 2014/0316763 | A1 * | 10/2014 | Tardif | G06F 3/017 704/3 |
| 2015/0126845 | A1 * | 5/2015 | Jin | G02B 27/017 600/383 |
| 2015/0302505 | A1 * | 10/2015 | Di | G06Q 30/0631 705/26.7 |
| 2016/0091964 | A1 * | 3/2016 | Iyer | G02B 27/017 345/633 |
| 2016/0162022 | A1 * | 6/2016 | Seth | G06F 3/017 345/156 |
| 2016/0188902 | A1 * | 6/2016 | Jin | G06F 21/6245 726/28 |
| 2016/0209648 | A1 * | 7/2016 | Haddick | G02B 27/0093 |
| 2016/0217325 | A1 * | 7/2016 | Bose | G11B 27/17 |
| 2016/0328604 | A1 * | 11/2016 | Bulzacki | G06Q 50/00 |
| 2017/0011210 | A1 * | 1/2017 | Cheong | H04W 12/06 |

OTHER PUBLICATIONS

Ren et al. "Robust Hand Gesture Recognition Based on Finger Earth Mover's Distance with a Commodity Depth Camera" ACM (12/11) pp. 1-4.*

International Search Report and Written Opinion corresponding to PCT Application No. PCT/US2016/027746, dated Jul. 27, 2016 (13 pages).

* cited by examiner

SYSTEM AND METHOD FOR AUTOMATED SIGN LANGUAGE RECOGNITION

CLAIM OF PRIORITY

This application claims priority to U.S. Provisional Application No. 62/148,204, which is entitled "System and Method For Automated Sign Language Recognition," and was filed on Apr. 16, 2015, the entire contents of which are hereby incorporated by reference herein. This application claims further priority to U.S. Provisional Application No. 62/173,878, which is entitled "Sign Transition Modeling and a Scalable Solution to Continuous Sign Language Recognition for Real-World Applications," and was filed on Jun. 10, 2015, the entire contents of which are hereby incorporated by reference herein.

FIELD

This disclosure relates generally to the field of sign language recognition (SLR) and, more specifically, to systems and methods for SLR including Hidden Markov Models (HMMs) and the modeling of non-dominant-hand features in sign language recognition.

BACKGROUND

Sign languages are natural languages mainly used by hard-of-hearing (HoH) people. While spoken languages use voices to convey meaning, sign languages utilize hand shape, orientation and movement, sometimes with the aid of facial expression and body movement, to express thoughts. Modern research has proved that sign languages are true languages and can be the first languages of HoH people.

The World Health Organization estimates that over 5% of the global population (including 32 million children) has disabling hearing loss. The technology of SLR may lead to products that can benefit the HoH communities in various ways. However, compared with SR, SLR has received relatively limited research efforts and is immature yet. Introducing the mature SR techniques into SLR may lead to substantial progresses in SLR.

The tasks of SLR and SR are similar in the sense that they both attempt to transfer a sequence of input signals into a sequence of text words. While the input signals for SR are voice signals, those for SLR could be sensor signals from wearable device and/or image sequences from a camera. The similarity indicates that the SR frameworks can also be applicable for SLR. Though, certain strategies need to be used to handle special characteristics of sign languages.

One major characteristic of sign language is that in the signals of a sign phrases, there are transition parts of signals between every two sequential signs, before the first sign and after the last sign. In previous works for small-vocabulary continuous SLR, the transition parts are normally ignored in modeling. However for larger-vocabulary continuous SLR, modeling transition parts explicitly has been proven to be beneficial. The previous works that explicitly model transition signals require transition models structurally different from sign models and significantly increase the complexity of recognition. Consequently, improvements to SLR systems and methods that improve the recognition of sign language gestures for sign languages with a wide range of vocabulary sizes would be beneficial.

For sign languages, there are other special characteristics related to the non-dominant hand. The first characteristic is that the dominant hand and the non-dominant hand are not equally important for sign languages. For example, frequently used sign-language words normally only involve the dominant hand in signing. The second one is that for the dominant-hand-only signs, the non-dominant-hand signals may not be stable and are influenced by the neighborhood signs or even additional actions. Strategies to handle these characteristics related to the non-dominant hand are thus beneficial for sign language recognition.

SUMMARY

The method includes generation of explicit models for the transition signals before, between, and after signs within a HMM framework. In traditional speech recognition, an HMM based framework trains HMMs for phonemes as well as for the short pause between words and the silence between phrases. The speech recognition HMM then connects the phoneme HMMs into word HMMs and connects the word HMMs with the short pause/silence HMMs into a decoding network. Recognition is conducted by searching for the path with the highest probability in the decoding network given the input signals. FIG. 2 illustrates a prior art decoding network 200 for SR along with the HMM structures.

The HMM framework for SLR differs from existing SR frameworks. The system generates an HMM framework for SLR through (1) training a HMM for each gesture that forms an individual sign; (2) training a transition HMM for the transition signals between two continuous signs within a larger phrase, a start HMM for the transition signals before the first sign of sign phrase begins, and an end HMM after the last sign of a phrase finishes; and (3) connecting the sign and transition HMMs into phrases with the transition/st/end HMMs into a decoding network similar to that of SR, as illustrated in FIG. 3. In this way, the system generates an HMM-based recognition framework for the task of SLR. The SLR framework generates explicit models of transition signals to reduce the influence from the neighborhood signs on the modeling of signs, which improves the recognition accuracy.

The SLR system also incorporates features that are extracted from the dominant hand and non-dominant hand into the training of HMMs. While traditional speech recognition comes from the single voice of a user, the input of the SLR system comes from two channels, which correspond to the movements of the left and right hands. One characteristic of sign language is the usages of dominant and non-dominant hands are unbalanced. The dominant hand is used in most signs, while the non-dominant hand appears less frequently and mainly plays an assistant role compared with the dominant hand. This characteristic indicates that incorporating dominant-hand and non-dominant-hand information in a distinguishing way may be beneficial. The system optionally employs two embodiments to only keep key information from the non-dominant hand in modeling and thus make the SLR system focus more on the dominant hand. In one embodiment, the system only includes features from the non-dominant hand related to the hand global angles in modeling.

Experiment results indicate that compared with equally including left/right hand information, the first approach effectively improve the recognition accuracy while the second approaches provides comparable accuracy. One additional advantage is that using the two approaches, the non-dominant-hand device (e.g., digital gloves) to collect sign signals can be substantially simplified, only requiring one or several sensors to get the hand global angles during sign movements.

The SLR systems and methods described herein also model the non-dominant hand variances for dominant-hand-only signs. The non-dominant hand variance models are designed to handle the special characteristic of sign language that the non-dominant hand inputs of dominant-hand-only signs are influenced by the neighborhood signs or even additional actions. The system design includes a Tying-with-Transition (TWT) solution to reduce the impact of this phenomenon on recognition performance. One embodiment of a training and sign language recognition method ties the non-dominant-hand related parameters of the transition model with those of the models for dominant-hand-only signs, and updates the decoding network by including the tied model as an alternative option for each dominant-hand-only sign model in the decoding network if this sign follows a double-hand sign. The advantage of adopting this solution is an increase in the robustness of the SLR system.

As mentioned in the last two paragraphs of the last section, previous works in SLR either did not explicitly model transition signals or modeled transition signals with the need to introduce complex recognition procedures. Prior art SLR systems do not distinguish between the left and right hand gestures as described herein. The SLR systems and methods described herein differ from previous works.

In one embodiment, a training method for automated sign language recognition has been developed. The method includes receiving, with an input device, a plurality of training inputs corresponding to a plurality of predetermined sequences of signs from hand movements and postures of a user, extracting, with the processor, a first set of features from the training inputs corresponding to hand movements and postures of the user for each sign in the plurality of predetermined sequences of signs, generating, with the processor, a first Hidden Markov Model (HMM) based on the first set of features from the training inputs corresponding to hand movements and postures for each sign in the predetermined sequences of signs, extracting, with the processor, a second set of features from the training inputs corresponding to hand movements and postures of the user for transitions between signs in the plurality of predetermined sequences of signs, generating, with the processor, a second HMM based on the second set of features from the training inputs and the predetermined sequences of signs, extracting, with the processor, a third set of features from the training inputs corresponding to hand movements and postures of the user for starting and ending each predetermined sequence of signs in the plurality of predetermined sequences of signs, generating with the processor a third HMM based on the third set of features from the training inputs and the predetermined sequences of signs, and storing, with the processor, the first HMM, second HMM, and third HMM in a memory for recognition of additional signs received from the input device.

In another embodiment, a method for automated sign language recognition has been developed. The method includes receiving, with an input device, an input based on a plurality of hand movements and postures of a user that correspond to a sequence of signs, extracting, with a processor, a plurality of features from the input corresponding to the plurality of hand movements and postures, identifying, with the processor, a start of the sequence of signs in the input based on a first set of features in the plurality of features and a first Hidden Markov Model (HMM) stored in the memory, identifying, with the processor, a first sign in the input based on a second set of features in the plurality of features and a second HMM stored in the memory, and generating, with an output device, an output corresponding to the first sign from the input.

In another embodiment, a system for automated sign language recognition has been developed. The system includes an input device configured to receive input corresponding to a plurality of hand movements and postures from a user corresponding to a sequence of signs, an output device, a memory, and a processor operatively connected to the input device, the output device, and the memory. The processor is configured to receive an input from the input device based on a plurality of hand movements and postures of a user that correspond to a sequence of sign, extract a plurality of features from the input corresponding to the plurality of hand movements and postures, identify a start of the sequence of signs in the input based on a first set of features in the plurality of features and a first Hidden Markov Model (HMM) stored in the memory, identify a first sign in the input based on a second set of features in the plurality of features and a second HMM stored in the memory, and generate an output with the output device corresponding to the first sign from the input.

DETAILED DESCRIPTION

Figure 1:
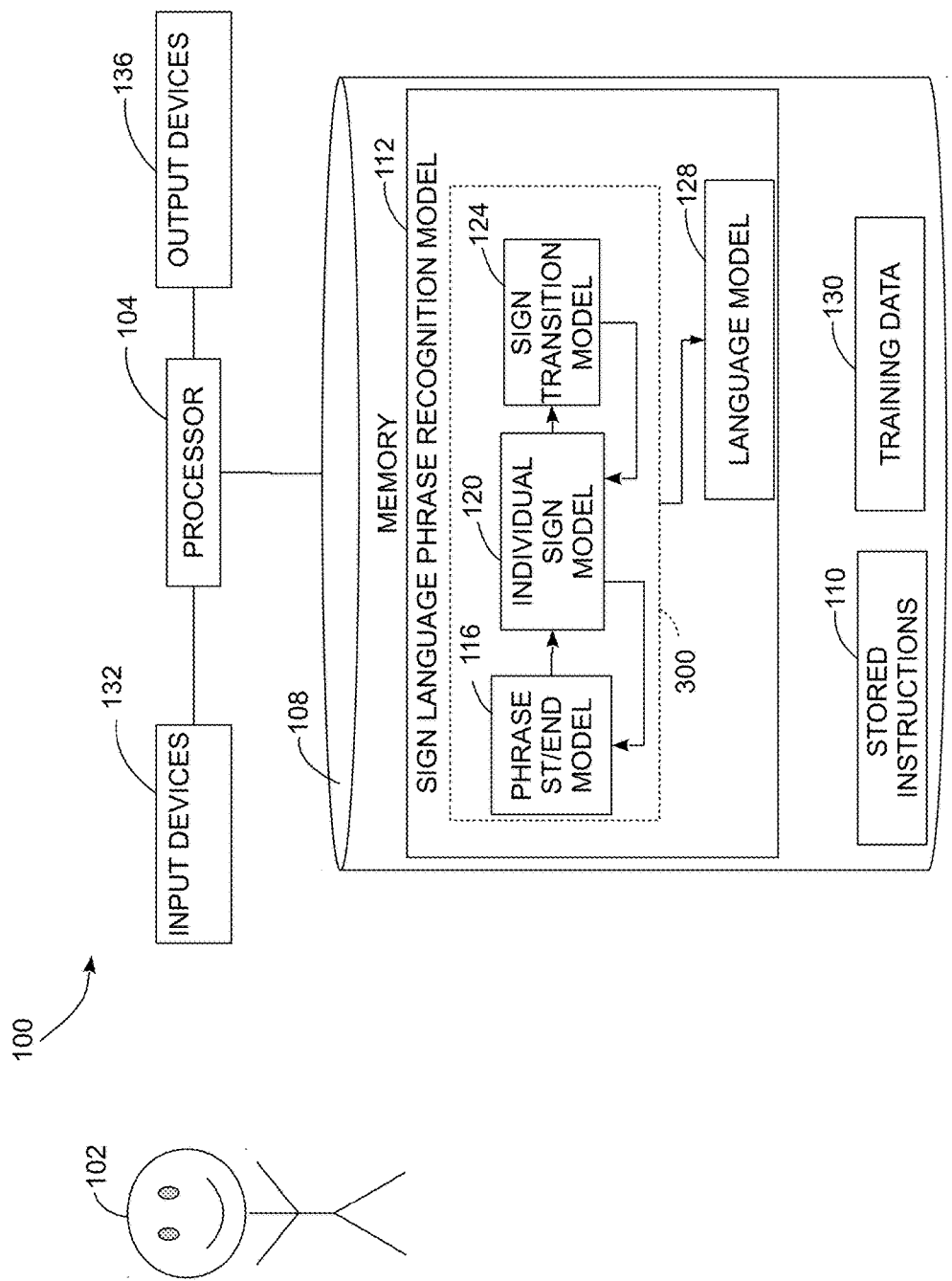
FIG. 1 is a schematic diagram of a system that performs automated sign language recognition.
Figure 2:
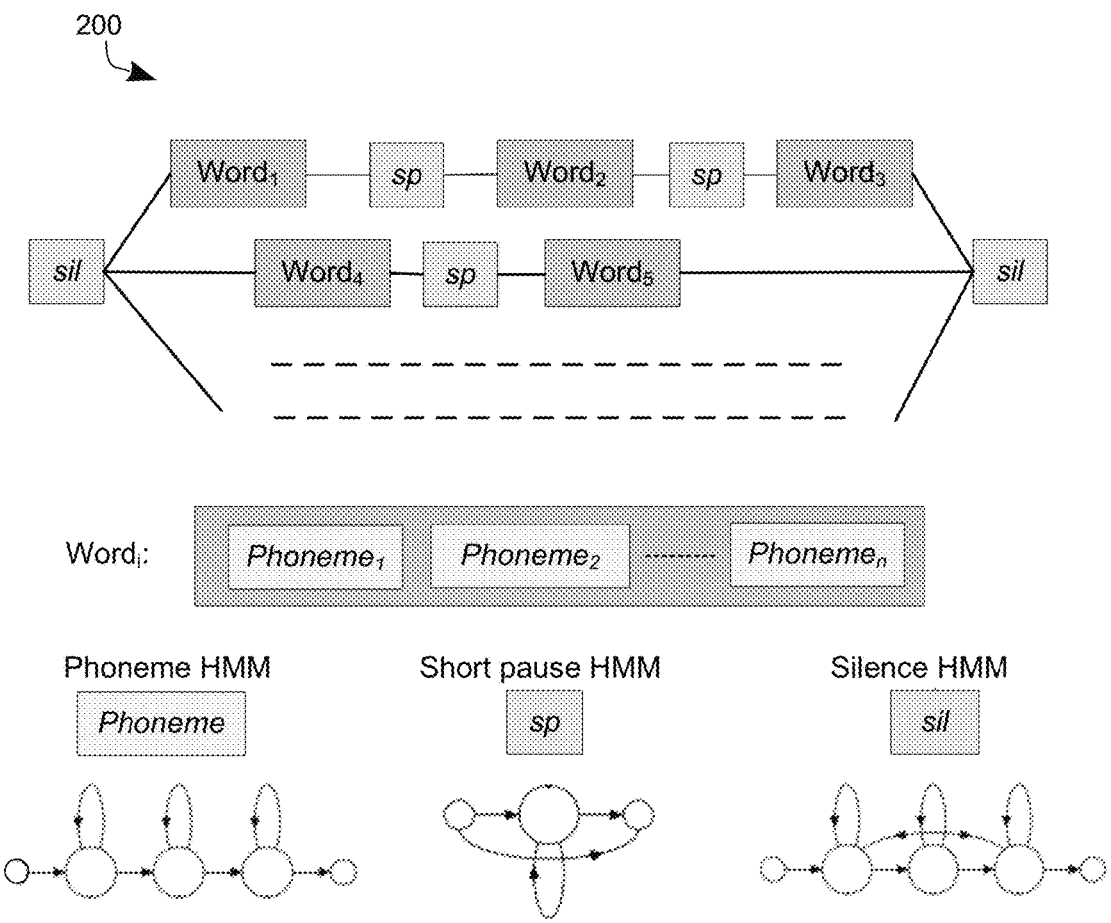
FIG. 2 is a diagram of a prior art Hidden Markov Model (HMM) decoding network that is used in speech recognition.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the terms "sign phoneme" or more simply "phoneme" are used interchangeably and refer to a gesture, handshape, location, palm orientation, or other hand posture using one or two hands that corresponds to the smallest unit of a sign language. Each sign in a predetermined sign language includes at least one sign phoneme, and as used herein the term "sign" refers to a word or other unit of language that is formed from one or more sign phonemes. In some instances a single sign phoneme corresponds to a single word, while in other instances multiple phonemes form a single word depending upon the conventions of the sign language. Many signed words can use the same phoneme or different phonemes more than once in a sequence to form a single word or express an idea in the context of a larger sentence or phrase. As used herein, the term "transition" refers to the movements of the hands that are made between individual signs, such as between sequences of sign phonemes that form individual words or between the phonemes within a single sign. Unlike a sign phoneme, a transition movement is not a typical unit of a sign language that has independent meaning, but transition movements still provide important contextual information to indicate the end of a first word or phoneme and the beginning of a second word or phoneme. As used herein, the term "st/end" refers to hand movements and postures of the user for starting and ending a sequence of signs, including predetermined sequences of signs that are used in a training process for sign language recognition and for non-predetermined sequences of signs that an automated sign language recognition system detects during operation. As used herein, the term "phrase" refers to any sequence of signs that include some form of start and end hand motions along with motions for at least one individual sign. In phrases that include multiple signs, a transition hand movement separates individual signs within the phrase. Phrases can correspond to any sequence of interrelated signs such as signs corresponding to multiple words in a complete sentence or shorter word sequence. A phrase can also include, for example, sequences of numbers or individual letters in a predetermined sign language.

As used herein, the term "dominant hand" refers to a hand of the user that performs a greater number of movements when producing signs. The term "non-dominant hand" refers to the other hand that performs fewer movements. Many sign language conventions specify that dominant hand performs most of the movements to form signs while the non-dominant hand performs fewer gestures to form the signs. In many instances the dominant hand is the right hand of the user while the non-dominant hand is the left hand, although the roles of the hands may be reversed for some signers, such as left-handed signers, or for different sign language conventions where the left hand is the dominant hand for forming signs.

As described below, a sign language recognition (SLR) system records data based on the hand gestures of a user who produces one or more signs in at least one form of recognized sign language. The system receives input using, for example, gloves that include motion and position sensors or from recorded video data of the hands while the user performs sign gestures. The system also includes one or more digital processing devices, data storage devices that hold a system of Hidden Markov Models (HMMs) that are used to recognize sign language gestures, and an output device. The digital processing devices analyze recorded data from the gestures and identify the meanings of words in the sign language from one or more hand gestures that correspond to different sign phonemes and with reference to transitions movements as the user repositions his or her hand to form different sign phonemes in one or more words. In some embodiments, the system also distinguishes between left-hand and right-hand gestures and analyzes the movements of both hands since some forms of sign language use the left and right hands for different purposes. The output device generates a text or audio translation of recognized signs, and the output can be provided to other humans for translation or additional computing systems receive the input to enable automated sign language recognition as a human machine interface.

FIG. 1 depicts an embodiment of a system 100 that performs automated sign language recognition. The system 100 includes a processor 104, memory 108, one or more input devices 132, and one or more output devices 136. The processor 104 is, for example, a digital microprocessor that includes one or more central processing unit (CPU) cores and optionally one or more graphical processing unit (GPU) units, digital signal processors (DSPs), field programmable gate arrays (FPGAs), and application specific integrated circuits (ASICs) for processing data from the input devices 132 and generating output using the output devices 136. In one embodiment of the system 100 that is described in more detail below, the input devices 132 include two gloves that the user 102 wears while producing sign language input. The gloves include accelerometers and gyroscope sensors that provide input data tracking the position, movement, orientation, and hand shape of both the dominant hand and non-dominant hand of the user 102 as the user 102 performs different sequences of signs.

The memory 108 includes one or more volatile memory devices such as dynamic or static random access memory (RAM) and one or more non-volatile memory devices such as a magnetic disk or solid state storage device that store program instructions 110, model data, and other forms of data for operation of the system 100. In the embodiment of FIG. 1, the memory 108 includes a sign language phrase model 112 that is formed from three classes of different Hidden Markov Models (HMMs) including a phrase st/end (st/end) model 116, individual sign models 120, and a sign transition model 124. The combined HMMs 116-124 form a sign language recognition decoding network 300. The overall sign language phrase recognition model 112 uses the individual HMMs 116-124 in the decoding network 300 to identify the beginning and end of phrases, individual signs within a phrase, and transitions between signs in multi-sign phrases in features that are extracted from the input received from the input devices 132. The sign language phrase recognition model in the memory 108 also includes a language model 128 that converts identified signs from the sign language phrase recognition model 112 into phrases/sentences for one or more languages, such as Chinese or American Sign Language phrases/sentences. The memory 108 also stores training data 130 that the processor 104 uses to generate the HMMs in the sign language phrase recognition model 112.

During operation, a user 102 provides sign language input to the system 100 using the input device 132. In a training mode, the user 102 provides sign inputs to the input devices 132 for one or more predetermined sequences of signs that the processor 104 stores with the training data 130 in the memory 108. As described in more detail below, the processor 104 uses the predetermined structure of the sign sequence and observed features that are extracted from the training input data to train the multiple HMMs for the phrase st/end model 116, individual sign models 120, and sign transition model 124. In a recognition mode, the user 102 provides sign inputs to the system 100 using the input devices 132 and the system 100 uses the trained HMMs 116-124 along with the language model 128 to identify sequences of signs based on the hand movements and postures of the user 102. The system 100 generates an output using the output devices 136 to, for example, generate an audio output in a predetermined language based on the identified signs in each phrase. In other embodiments, the output device 136 is a display screen or network adapter that displays or transmits, respectively, a text representation of the identified signs. In still other embodiments, the system 100 receives the signs as command inputs and the processor 104 executes stored program instructions 110 based on the identified command inputs to produce an output using one or more of the output devices 136.

Figure 3:
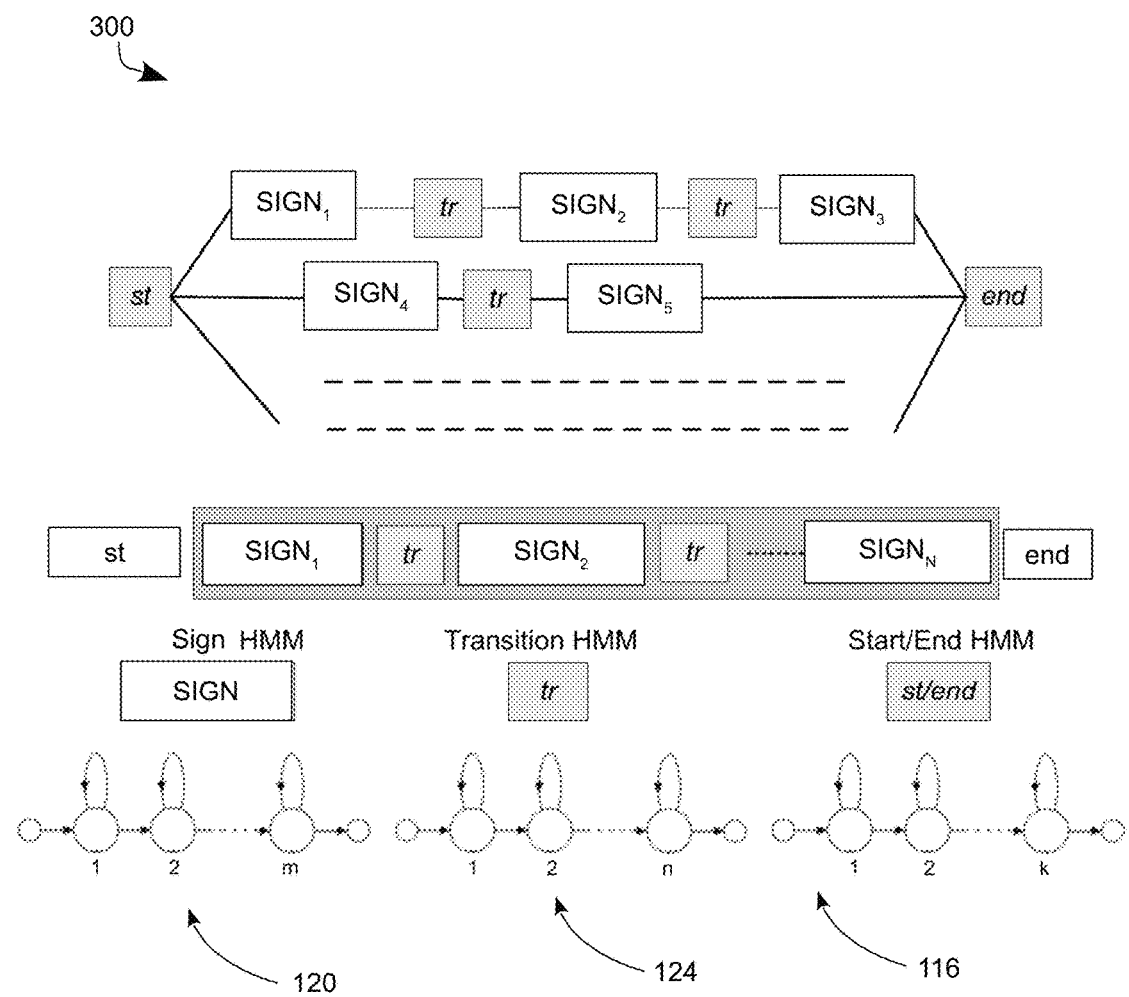
FIG. 3 is a diagram of an HMM decoding network that is used in sign-language recognition.

The sign language recognition (SLR) system 100 trains HMMs and builds a decoding network in a similar way as conventional HMM-based speech recognition system. The SLR system views every unique basic sign as a sign phoneme, and trains a HMM for it. Each sign word can thus be modeled by connecting the HMMs of the component sign phonemes, just like speech words are modeled by connecting voice phoneme HMMs. The decoding network is constructed by connecting sign word models using a language model, which can be grammars, n-grams, or other types of language model. The special treatment needed for SLR lies in the modeling of transition. The system trains a HMM, called the transition model, to model the transition signals between neighboring signs. A start (st) HMM and an end HMM are also trained to model the transition signals in a phrase before the first sign and after the last sign respectively. The system then modify the decoding network by inserting the transition model between neighboring sign phonemes, inserting the start model before phrase start nodes and inserting the end model after the phrase end nodes. FIG. 3 illustrates the decoding network along with the HMM structures in the system 100 in more detail. In FIG. 3, an HMM-based SLR decoding network 300 incorporates all of the HMMs, including sign HMMs 120, the transition HMM 124, and the st/end HMM 116. All of these HMMs adopt a left-to-right HMM structure. The HMM decoding network 300 uses a fixed number of states within the sign HMM 120 to encode each of the potential sets of features for different sign phonemes. The numbers of states are tuned for the sign HMM 120, the transition HMM 124, and the st/end HMMs 116, respectively.

Figure 8:
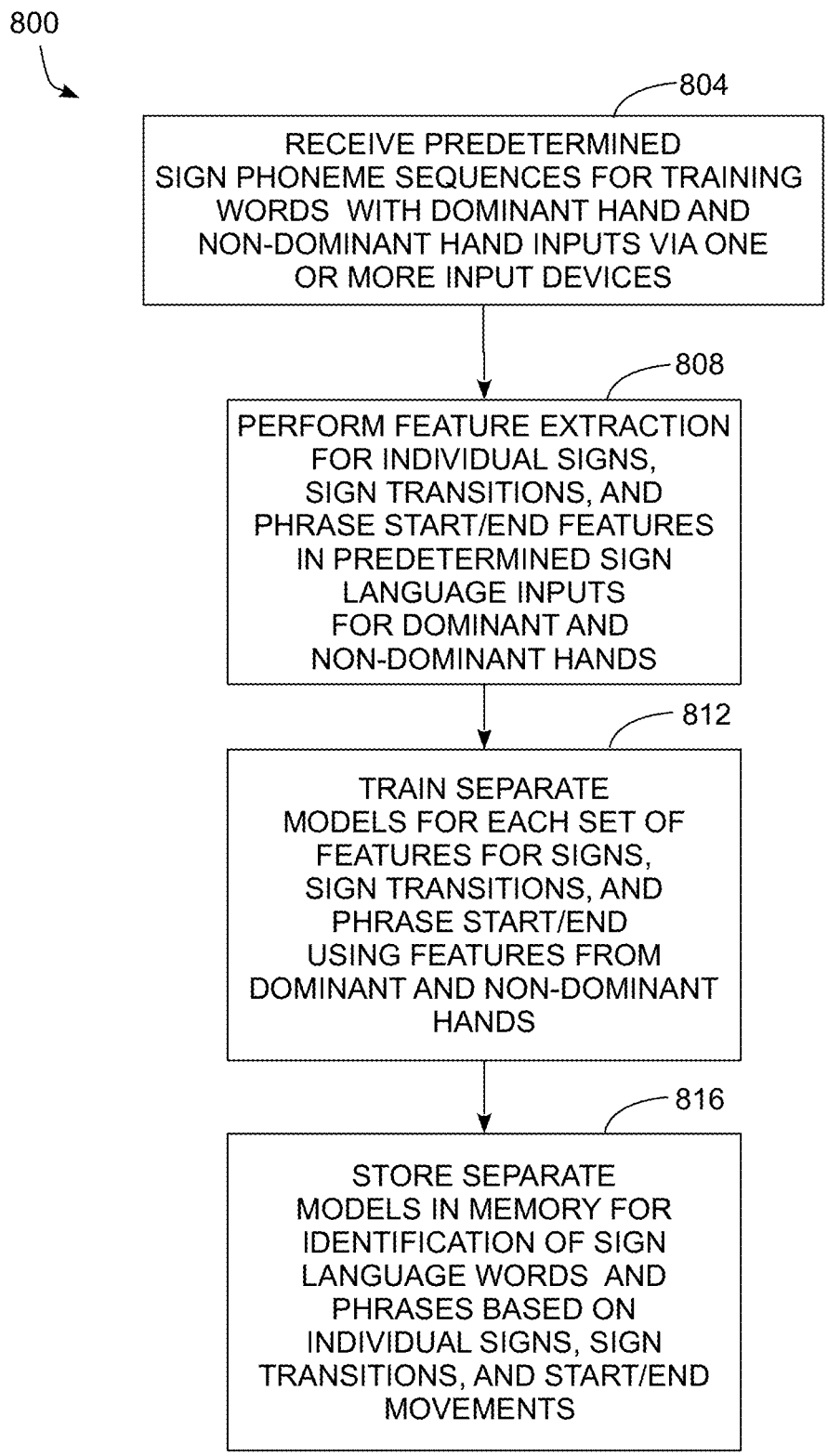
FIG. 8 is a block diagram of a process for training HMMs in the system of FIG. 1.

FIG. 8 is a block diagram of a training process 800 for training HMMs that identify features corresponding to hand movements and postures for each sign, transition between signs, and start and end hand movements and postures for predetermined sequences of signs corresponding to multiple phrases in a training process. As set forth below, a description of the process 800 performing an action or function refers to the operation of a processor to execute stored program instructions to perform the function or action in association with other components in the automated sign language recognition system. The process 800 is described in conjunction with the system 100 of FIG. 1 for illustrative purposes.

Figure 4:
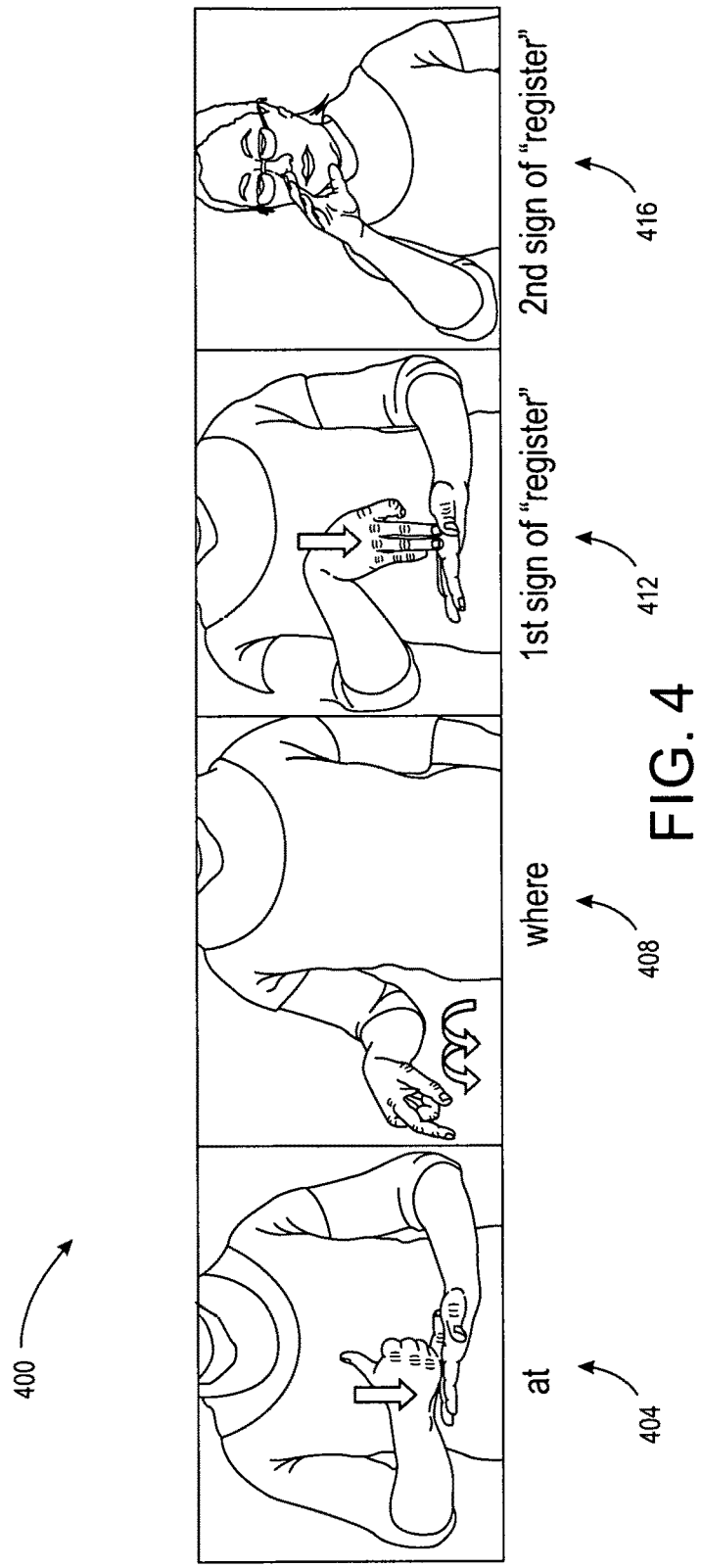
FIG. 4 is a diagram depicting hand movements and postures in a sign language phrase.

Process 800 begins as the system 100 receives predetermined sequences of signs in a sign language from the input device 132 including generated sensor data from both the dominant and non-dominant hands of the user 102 or other users who perform the training process (block 804). In some embodiments, each sequence of sign language inputs includes a set of phonemes that correspond to a single word in a predetermined sign language, but the inputs also include start and end features from the user and transitions between sign phonemes. FIG. 4 depicts an example of an input with a sequence of individual signs that form one predetermined sequence during the training process. In some embodiments of the process 800, each of the signs in FIG. 4 forms one input sequence to the training process 800. Since signs are formed from individual phonemes, the training process 800 does not require input for all possible words and phrases in the language, but the system 100 receives a representative sample of the sign phonemes, st/end signals, and transitions during the process 800 to enable recognition of sign language words that are not directly included in the training data inputs. In FIG. 4 the sequence 400 includes a phrase formed from four individual signs for the words "at" (sign 404), "where" (sign 408), and two signs that specify the word "register" (signs 412 and 416). In addition to the hand movements and/or postures that form the signs, the system 100 also receives input data for the hand movements and postures that the user performs at the beginning and end of the predetermined sequence along with transition movements for the hands that occur between the signs in the sequence. As used herein, the terms "hand posture" or more simply "posture" refer to the orientation and shape of the hand, including either or both of the palm and fingers, that conveys information in sign phonemes along with the motion of the hand and fingers on the hand. During the process 800 the system 100 receives multiple inputs for a wide range of phrases from one or more users to provide a set of training data that not only provide training information for the recognition of individual signs, but further include input data corresponding to the st/end hand motions for phrases and for transitions between signs within the phrases.

During the process 800, the system 100 collects training inputs that include a certain number of samples are collected for each of the sign words in the vocabulary, including both signs that include a single phoneme and multi-phoneme signs. To make a full use of the captured data, the system 100 classifies the input data in several segments, i.e., the component signs, preceded by the start part (i.e., from the beginning to the start of the first sign), followed by the end part (i.e., from the finishing point of the last sign to the end), and the transition parts. Each sign phoneme model can thus be trained on all the segments of the focused signs in the training data, while the transition, start, and end models can be trained on the corresponding segments, respectively. The main advantages of this data collection methodology is as follows: (i) when the vocabulary size increases, the need in training data increases only linearly; (ii) every word in the vocabulary, including uncommon words, can be robustly trained; and (iii) it is feasible to label word samples to provide reliable segmentation information for training, which is especially variable for noisy real-world data.

Figure 5:
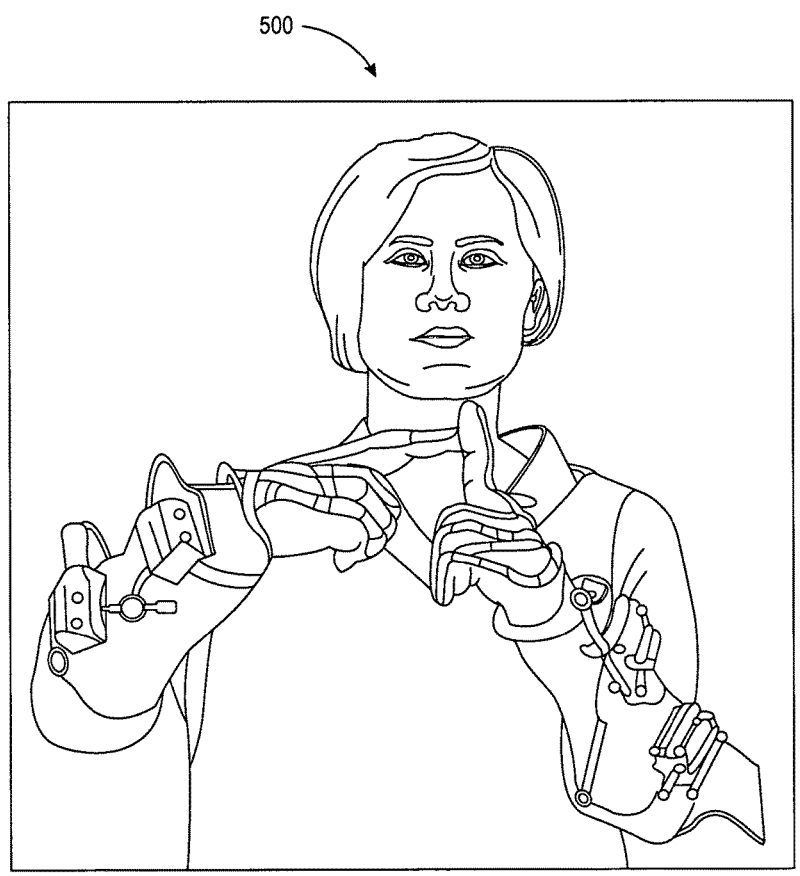
FIG. 5 is a depiction of an input device that includes gloves with sensors to detect the motion, position, orientation, and shape of the hands of a user who provides sign language input to the system of FIG. 1.
Figure 6:
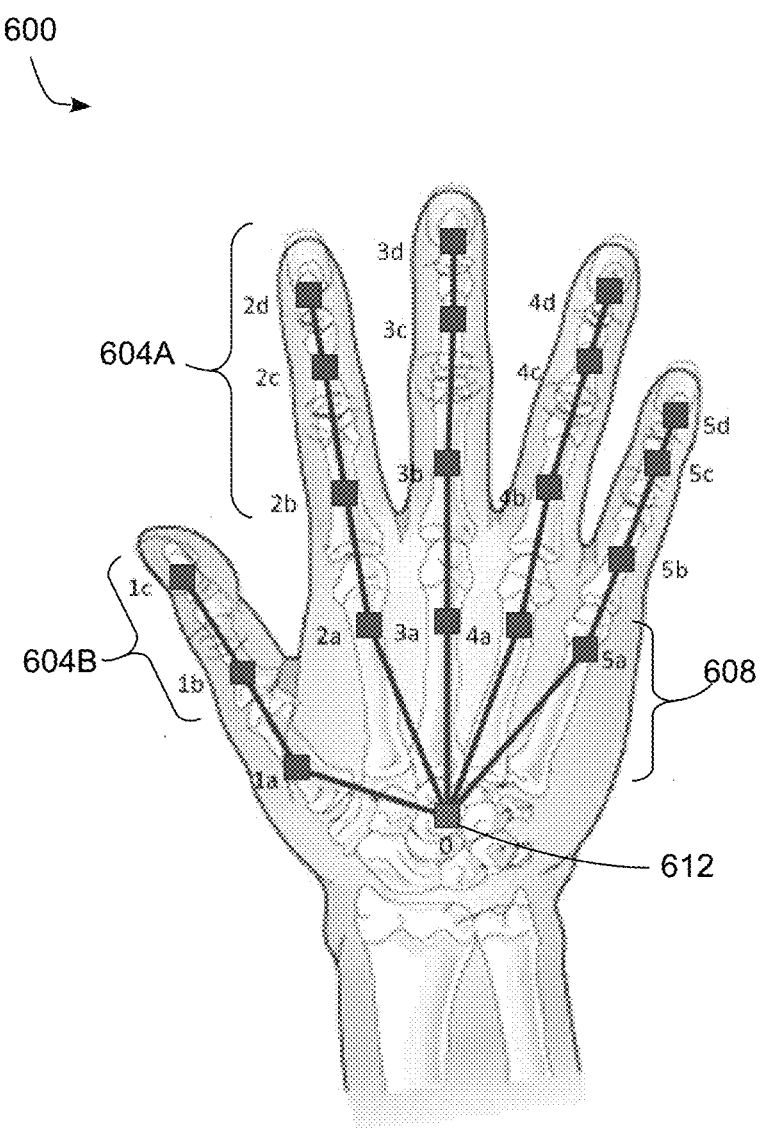
FIG. 6 is a drawing of the structure of a human hand and different locations in the hand for sensors to detect the motion and shape of the individual fingers in the hand and the motion, position, and orientation of the entire hand.

As described above, in one embodiment the system 100 uses gloves with sensors that record acceleration and hand angle position information for the dominant and non-dominant hands of the user. FIG. 5 depicts examples of gloves 500 that are worn during the process 800 and during subsequent sign language recognition processing. The gloves 500 include multiple sensors, such as micro-electromechanical systems (MEMS) sensors that record the altitude, orientation, and acceleration of different portions of the dominant and non-dominant hands of the user as the user performs hand movements/postures to form the signs in the predetermined sequence. FIG. 6 depicts a more detailed view of one embodiment of the sensors 600 in a glove for a right hand. The sensors 600 include multiple sensors 604A and 604B that generate data for the position and movement of the phalanges (fingers) with the sensors 604A on the fingers and 604B on the thumb. The sensors 600 also include sensors 608 that generate data for the position and movement of the metacarpal region (palm) of the hand and a sensor 612 that measures the position and movement of the carpal region (wrist) of the hand. While FIG. 6 depicts a sensor arrangement for the right-hand, the system 100 includes a glove with a similar sensor arrangement for the left-hand as well.

Referring again to FIG. 8, the process 800 continues as the system 100 performs feature extraction to identify the features that correspond to individual signs, sign transitions, and the st/end movements in the input corresponding to the predetermined sequence of sign phonemes (block 808). The feature extraction process enables the system 100 to identify characteristics of the sensor data for the hand movement/posture inputs in a uniform manner to train the HMMs 116-124 for subsequent sign language recognition operations. In some embodiments, the system 100 receives manually inputted timestamps that categorize different sets of features for hand movements and postures that correspond to the st/end of the input, to different predetermined sign phonemes in each input sequence, and to the transitions between sign phonemes. Additionally, the system 100 optionally records time information for the predetermined sequence, which includes recorded data for hand movements/postures that occur in a predetermined order, to distinguish between the different sets of hand movements and postures for the feature extraction process. As described in more detail below, the extracted features include both finger related (FR) features that correspond to the movements and shapes of individual fingers and to global angle (GA) features that correspond to the overall angles and movements of the hands. In some embodiments the system 100 extracts different sets of features for the input data from the dominant hand and the non-dominant hand. The extracted features for both hands form the basis of training data to train the HMMs 116-124 in the system 100.

For the dominant and non-dominant hands, the feature set can be grouped into two categories: finger related and global angle related, which are referred to as FR features and GA features, respectively, herein. The FR features include the closeness of each finger, the openness of the thumb, and the deltas (i.e., the differences between the current and the previous frames) of these features. The GA features refer to the posture of the hand and are derived from the global polar angles, x, y and z, for a hand. The features include trigonometric functions of the angles and the delta of the angles for the hand as the hand moves to different positions and orientations to produce signs, inter-phoneme transitions, and phrase start/end gestures and postures.

Given a series of sampled angular velocity values given by sensors at a time $t_i$ as $\bar{\omega}_s^{t_i}$, and the angle rotated in each sample period can be estimated by $$\bar{\theta}_{s,i} = \frac{\bar{\omega}_s^{t_i} + \bar{\omega}_s^{t_i-1}}{2}(t_i - t_{i-1}).$$

If the rotation quaternion is $q_{s,i}$, and given some initial attitude quaternion, $p_s$, then the current orientation after M accumulated rotations is $Q_{s,M}^{-1} p_s Q_{s,M}$, where $Q_{s,M} = q_{s,M}^{-1} q_{s,M-1}^{-1} \ldots q_{s,1}^{-1}$ and $Q_{s,M}^{-1} = q_{s,1} q_{s,2} \ldots q_{s,M}$. The processor 104 identifies the rotation and angular position of both the dominant and non-dominant hands using the Hamilton product of the quaternions based on the different sensor inputs and features that are generated at different times as the system 100 receives input from the user 102. In the process 800, the system 100 uses the quaternions identified by angular velocity and acceleration to represent accumulated rotation and positions for the angles of both hands in three-dimensional spaces, such as the three-dimensional space in which the hands move to produce the training sequences, in a simple manner that avoids gimbal lock and since quaternion operations are mathematically non-commutative, which accurately represents the physical characteristics of the rotational movements of the hands of the user.

Figure 7:
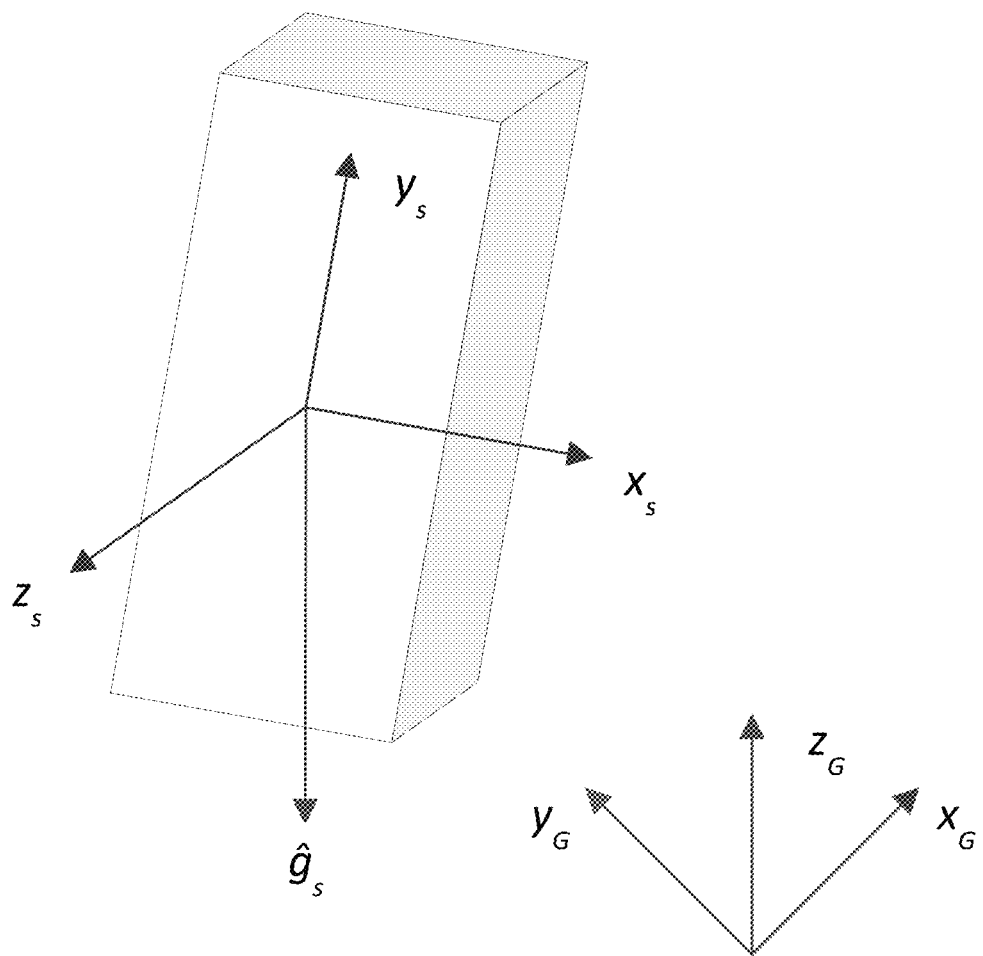
FIG. 7 is a diagram of coordinate on each sensor in a three-dimensional space used during feature extraction for input data corresponding to movements of the hands of a user in the system of FIG. 1.

FIG. 7 depicts components of the quaternions that the process 800 uses to extract the features. FIG. 7 depicts three spatial axes of movement $x_s$, $y_s$, and $z_s$ for the hand of the user 102 while forming sign phonemes or transitions. The axes $x_g$, $y_g$, and $z_g$ indicate a predetermined absolute coordinate system and the orientation of the hand changes within the absolute coordinate system. The sensors in the input device gloves 132 that the user 102 wears to provide input to the system 100 are In FIG. 7, the downward direction of gravity serves as an initial attitude unit quaternion, $p_s$. The user 102 hangs his or her arms with hands and fingers extended downward in parallel to the direction of gravity (shown as $g_s$ in FIG. 7) in the direction of the quaternion, $p_s$ at the beginning of each training sign input sequence, to enable each initial quaternion $p_s$ in the input data to be aligned with the single reference quaternion for gravity without requiring complex calibration for the individual bones in the fingers and other portions of the hands of the user.

Given a sampled acceleration of $\bar{a}_s^{t_i}$, the system 100 estimates the gravity using the mean of the first k samples, $$\bar{g}_s = \frac{1}{k}\sum_{i=0}^{k-1} \bar{a}_s^{t_i},$$

and $p_s$ is the unit quaternion of $\hat{g}_s = \bar{g}_s/|\bar{g}_s|$. The system 100 estimates the directions of the finger bones pointing in a global coordinate space, as $O_{s,i} = q_0 Q_{s,i}^{-1} p_s Q_{s,i} q_0^{-1}$, where $q_0$ is the rotation from the initial sensor coordinate to the global coordinate according to the sensor coordinate.

As mentioned above, the system 100 extracts two types of features from the input data. The first type of feature corresponds to features of the hand shape (finger related, or FR), and the second type of feature corresponds to the hand direction (global angle of hand, or GA). In one embodiment, the FR feature for the hand shape is the cosine distance between the directions of adjacent finger bones, $A_{s,r}^i = O_{s,i} \cdot O_{r,i}$. For instance, if s='2c' and r='2b', as depicted in the hand configuration of FIG. 6, then $A_{s,r}$ describes a rotation about the proximal interphalangeal joint (the second far end joint of the index finger). The system 100 extracts the FR features for each finger. In some embodiments, the system 100 only extracts the FR features for individual fingers only in the dominant hand while extracting the GA features for both the dominant and non-dominant hands as described in more detail below. In other embodiments, the system 100 extracts both the FR and GA features for both the dominant and non-dominant hands.

To extract the GA features for the direction of the hand, more specifically the direction of the palm, the system 100 identifies the mean of the directions of sensors that are associated with the palm of the hand, such as sensors '2a', '3a', '4a' and '5a' in FIG. 6. The system 100 extracts a feature that fully describes the direction of the hand in space based on two perpendicular directions, a first direction along the palm plan and a second direction along the normal of the palm plan. Additionally, the system 100 optionally identifies velocity and acceleration features of the finger bones or of the palm of the hand by identifying multiple rotational positions over time. The system 100 uses the quaternion representation of $\bar{a}_s^{t_i}$ including multiple measurements from the sensors generated at series of predetermined sampling times instead of the single measurement $p_s$ to estimate the accumulated rotation of either or both of the dominant and non-dominant hands.

Process 800 continues as the system 100 uses the extracted feature data from multiple predetermined sequences of sign inputs to train the HMMs 116-124 (block 812). The processor 104 generates the HMM 116 for the features that are extracted from the input data corresponding to the start end hand movements and postures, the HMM 120 for the features that are extracted from the input data corresponding to the sign hand movements and postures, and the HMM 124 for the features that are extracted from the input data corresponding to the transition hand movements and postures. To generate each of the HMMs, the system 100 performs a training process to generate the HMMs and the system 100 based on training inputs from the user 102 and the predetermined sign input sequences in the training data 130.

For sign languages, a word may contain one or more sign phonemes. The system 100 generates the HMM 120 for the sign phonemes to accurately model words based on three requirements. First, words have to be modeled in order to evaluate the feature probability, P(X|W). Second, language models have to be used to calculate the prior sentence probability, P(W). Third, the word models and language models have to be combined to form networks of HMM states in which the decoding for the most likely word string W* in the search space Γ can be performed. During the process 800, the processor 104 performs the training process to generate the HMM 120 for the sign phonemes based on the observed features for the signs conditioned upon the signs in the predetermined training sequences of signs. The processor 104 similarly performs the training process for the transitions 124 based on the observed features for the transitions conditioned upon the transitions between signs in the predetermined training sequences of signs and the training process for the phrase st/end hand movements 116 based on the observed features for the st/end hand movements conditioned upon the st/end hand movements in the predetermined training data 130.

The system 100 uses the extracted features from the feature data as a plurality of different feature vectors that form the inputs for the training processes of each of the separate HMMs including the st/end HMM 116, sign HMM 120, and transition HMM 124. The feature vectors include selected features from both the dominant hand and the non-dominant hand. The feature vectors include features from both hands that are recorded concurrently to map the movements of both hands that occur concurrently while the hands of the user 102 move to form signs and st/end or transition movements.

In one embodiment, the system 100 trains the sign phoneme models 120 based on the segments of the corresponding signs. Alternative training methods are based on the detailed properties of the start and end segments, which may vary based on different contexts for receiving training phrases. To normalize the start and end of each phrase during the training process, one training process embodiment require the signers to put both hands down before and after signing each phrase. The start segment for each phrase contains static hand position and posture signals followed by movement signals, while every end segment contains movement signals which may or may not be followed by static signals. The movement signals can be viewed as a type of transition. During the process 800, the system 100 labels each start segment into a static segment and a transition segment, and label each end segment into a transition segment and a static segment, if it exists. The training process for all of the HMMs in the decoding network 300 includes the start and end segments with both the static segments for hand posture and the dynamic segments for hand movement. The system 100 generates the start model HMM 116 by connecting the static model with the transition model. The end model HMM is includes two alternatives, one connecting the transition model with the static model, and the other only including the transition model. In the system 100, the model HMMS 116-124 are diagonal covariance Gaussian mixtures, and the system 100 re-estimates the HMMs iteratively after initialization as well as after splitting the Gaussian mixtures.

The training process implicitly includes Gaussian splitting that occurs within different sets of hand motions in the separate HMMs during the iterative process described above. For example, through the standard HMM training procedure of iterative re-estimation and Gaussian splitting, the transition model may contain multiple Gaussian mixture components in each state and thus implicitly perform classification on the transition hand movements and postures using the transition HMM 124 that occur between different signs that are encoded in the separate HMM 120. During process 800 the system 100 trains a "universal" transition HMM 124 that can identify the transitions that occur between multiple signs and does not require the system 100 to be trained to recognize tightly connected two-sign and three-sign sequences to accurately recognize sign language input. The st/end HMM 120 also servers a similar role to enable the system 100 to identify the features that correspond to the start and end of each phrase.

Process 800 continues as the processor 104 stores the separate HMMs 116-124 in the memory 108 (block 816). As described in more detail below, during a sign language recognition process the system 100 uses the trained HMMs to recognize sequences of signs that a user inputs to the system 100 using the input devices 132. The trained HMMs can of course recognize sequences of signs that correspond to the training data, but the system 100 is also configured to recognize a wide range of sign language sequences that do not exactly match the training sign sequences since the processor 104 uses the language model 128 to build a decoding network 300 that includes the separate HMMs to recognize individual signs and the transitions between signs with many different combinations that are not necessarily included in the training data directly.

In another embodiment of the process 800, the system 100 performs a different feature extraction process and HMM generation process for the processing of blocks 812 and 816 in the process 800. In the other embodiment, the system 100 employs a Tying-with-Transition (TWT) solution to enhance the robustness of the sign language recognition system towards the dominant-hand-only sign phoneme that immediately follows a double-hand sign in a given sign-sequence phrase. For dominant-hand-only signs, the non-dominant hand should involve no movements by definition, but in reality, may move due to the neighboring signs or additional action.

In the TWT embodiment, the system 100 separates the dominant-hand and non-dominant-hand features for extraction during the processing of block 808 in two data streams for HMM modeling. All the HMM models 116-124 are then trained using the same training procedures described above based on the two data streams, which results in two sets of Gaussian mixtures in each HMM state for the dominant-hand and non-dominant-hand related data streams respectively. Thus, in the TWT embodiment the processor 104 generates the HMM models 120 for signs based on a first portion of the first set of features from the training inputs corresponding to hand movements and postures for a dominant hand of the user that form the sign phonemes during the training process and based on a portion of the second set of features from the training data corresponding to the hand movements and postures of a non-dominant hand of the user to perform transitions during the training process.

The system 100 generates an additional enhanced HMM model for each of the dominant-hand-only sign model based on the trained HMM models for both hands by replacing the non-dominant-hand related Gaussian mixtures in the focused sign model with those non-dominant-hand related Gaussian mixtures in the transition model 124. Note that in this way, the non-dominant-hand variances are thus covered for the dominant-hand-only signs by the enhanced sign models. Both the enhanced dominant-hand-only sign models and the originally trained models (i.e., st/end model 116, sign models 120, and transition model 124) are utilized in block 816 for the TWT solution. The decoding network 300 is modified to incorporate the enhanced dominant-hand-only sign models based on the neighboring signs. If a sign in the decoding network 300 is a dominant-hand-only sign and the preceding sign in the same path involves the non-dominant hand, this sign model in the decoding network 300 is replaced with a confusion set of two parallel models, which include the corresponding enhanced model and the original model for this dominant-hand-only sign. The recognition procedure based on this modified decoding network remains the same.

Figure 9:
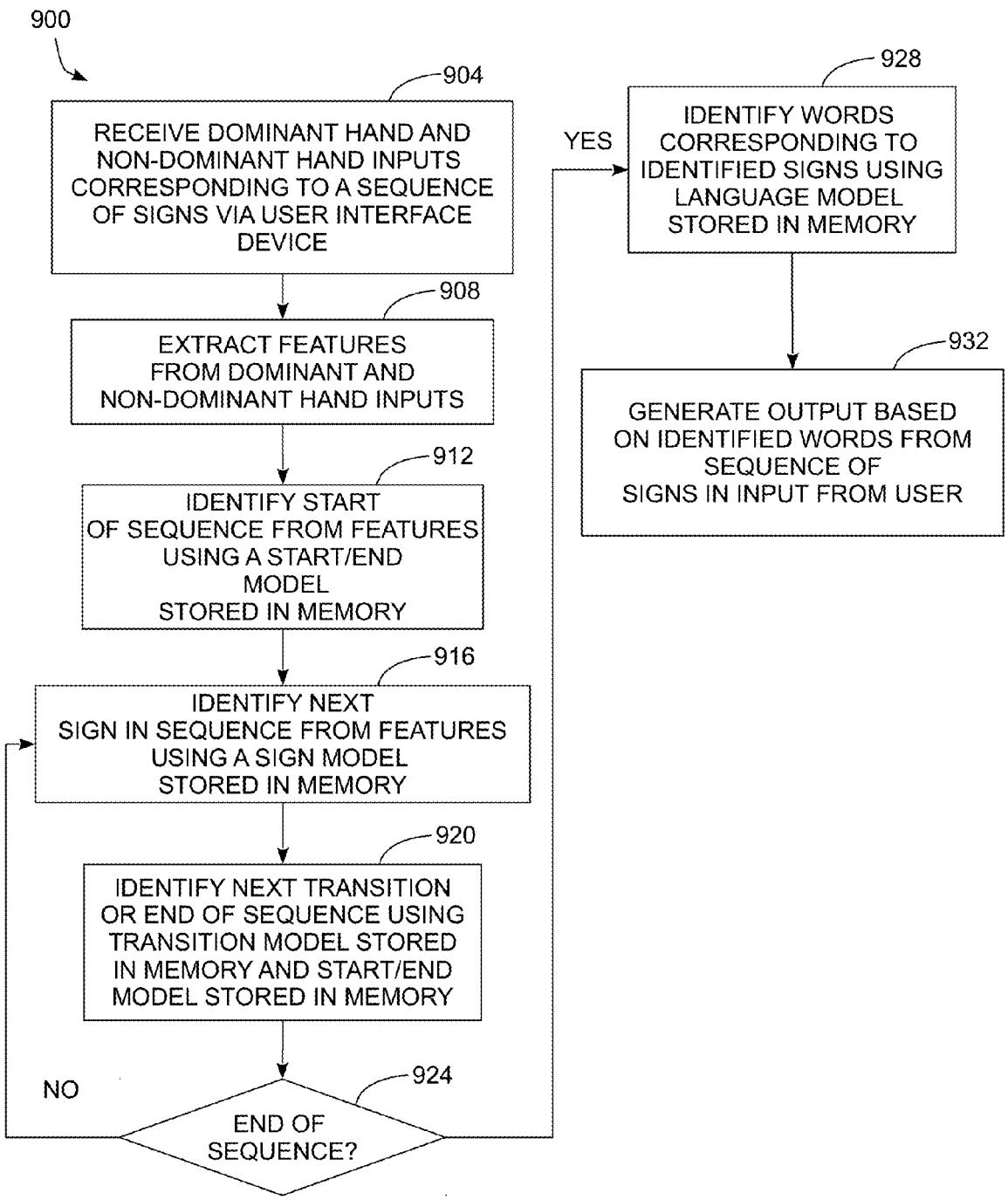
FIG. 9 is a block diagram of a process for performing sign language recognition using the system of FIG. 1.

FIG. 9 depicts a process 900 for automated sign language recognition. As set forth below, a description of the process 900 performing an action or function refers to the operation of a processor to execute stored program instructions to perform the function or action in association with other components in the automated sign language recognition system. The process 900 is described in conjunction with the system 100 of FIG. 1 for illustrative purposes.

Process 900 begins as the system 100 receives dominant hand and non-dominant hand input from the user 102 via the input devices 132 (block 904). As described above, in one embodiment the input devices are the gloves 500 that include sensors to record the hand movements and postures for the user 102 as the user 102 performs hand movements and postures corresponding to a sequence of signs.

Process 900 continues as the system 100 extracts features from the input data (block 908). The system 100 performs the feature extraction processing of block 908 in substantially the same manner as the feature extraction that is described above in conjunction with the processing of block 808 in the process 800. For example, the processor 104 extracts the same FR and GA features for the input data from the dominant hand and extracts the GA features and optionally the FR features for the input data from the non-dominant hand in the same manner as in the process 800 to produce feature vectors in the recognition process in the same manner as during the earlier training process.

Process 900 continues as the system 100 analyzes the extracted features from the input to identify a start of a sequence of at least one sign that forms a phrase (block 912). In the system 100, the processor 104 uses the st/end HMM 116 in the sign language recognition model 112 to identify features that correspond to the hand movements and postures associated with beginning a new sequence of signs. The processor 104 uses the same sets of extracted features for recognition using the HMM models in the decoding network 300 as are used during the training process of FIG. 8, such as sets of FR and GA features for the dominant hand and GA features for the non-dominant hand or the FR and GA features of the dominant hand in combination with the transition features of the non-dominant hand in the TWT embodiment. As indicated in FIG. 1, the HMMs 116-124 are linked to each other so after detection of the start of a sequence, the processor 104 analyzes the next set of features that occur in the time interval following the detection of the initial start feature with a high probability weighting toward the features corresponding to the phonemes in a given sign (block 916). The processor 104 uses the HMM 120 to identify the next sign in the sequence based on the next set of features that are extracted from the input sequence.

During process 900, the sign input data from the user 102 includes either a transition to a new sign or an input that signifies the end of a phrase. For example, in a multi-sign phrase the user performs a series of signs with transitions between the signs until the phrase is completed, while in a single-sign phrase the user produces an end of phrase motion after the sign. During process 900, the processor 104 uses both the transition HMM 124 and st/end HMM 116 to identify a set of features that precede and follow a sign in the input data (block 920). In some embodiments, the system 100 interprets an entire phrase of sign inputs as a whole, and the processor 104 uses the HMM network 300 in the sign language recognition model 112 to identify input based on the maximum likelihoods of word sequences based not only on a sequence of words extending forward in time but also backward in time once the system 100 has received the entire phrase. The processor 104 identifies a path using the HMM network 300 and a maximum a posteriori (MAP) estimation process with a Bayes decision formulation to identify the sign phonemes and sequences of signs in the trained HMMs that have the greatest likelihood of matching the extracted features from the input data to determine if a set of features corresponds to a transition between signs or the end of a phrase and determines the transition or end of phrase. Additionally, in some configurations the processor 104 also identifies the separation in time between the detection of features, which may indicate the likelihood of the features corresponding to a brief transition with a short time interval between signs or the end of a phrase with a somewhat longer time interval between signs. If the system 100 detects a transition but not the end of the sequence in the phrase (block 924), then the process 900 continues as the system 100 identifies the next sign in the sequence (block 916).

The processing of blocks 916-924 continues until the processor 104 identifies features that correspond to the end of the sequence of signs in the phrase (block 924). The recognition procedure of the detected phrase (block 928) simultaneously generates multiple hypothesized sign sequences, which are the top-ranked paths with the highest $P(X|W)$ $P(W)$ values (as in the formula above) in the decoding network 300 given the inputs related to the phrase, using the standard HMM decoding technology. During the process 900 the system 100 performs a maximum a posteriori (MAP) process with a Bayes decision formulation to identify the paths in the HMM decoding network 300 for recognition of the sign input from the user 102. The system 100 conducts sign language recognition based on the following formula:

$$W^* = \underset{W}{\operatorname{argmax}} P(W \mid X) = \underset{W \in \Gamma}{\operatorname{argmax}} P(X \mid W) P(W)$$

Where $X=\{x_1, x_2, \ldots, x_T\}$ is a sequence of T observed feature vectors corresponding to the unknown input sentence, $W=\{w_1, w_2, \ldots w_M\}$ is any sequence of M signs into which the input may be transcribed, and $\Gamma$ is the set of all allowable phrases representing the search space of the language model (e.g., grammars). As described above, a sign phoneme here refers to the smallest units that bear linguistic meaning in a predetermined sign language.

In the system 100, the memory 108 stores HMMs in the decoding network 300 and includes all the recognized sign-language phonemes along with st/end and transition gestures, for recognition of phrases that are supported by the language model for inputs from the user 102, which can be grammars, n-gram models, or other types of language model. The hypothesized sign sequence with the highest $P(X|W) P(W)$ value among the multiple hypotheses generated is used as the result of the sign language recognition procedure for the detected phrase. Block 928 further translates that sign sequence from a predetermined sign language into one or more different spoken or written languages such as Chinese or English. To ensure a proper grammatical output, the translation procedure may include reordering the words in the output from the actual order of the signs as entered by the user 102 or adding additional articles, conjunctions, prepositions, and other words that are not directly included in the sign language to the final output.

After receiving one or more phrases, the system 100 generates an output corresponding to the identified words from the sign language input (block 932). As described above, in some embodiments the processor 104 generates synthesized speech for the words in the output using a loudspeaker or other audio output device 136. In this mode, the system 100 can produce audio output for recipients who can hear but are unable to understand the signs from the user 102. In another configuration, the output device 136 includes a display device that generates a text output corresponding to the signs from the user 102. In still another configuration, the system 100 either performs a command based on the sign inputs from the user 102. For example, in some embodiments the system 100 is further connected to a home automation system or other system that normally receives speech input, but in the configuration of FIG. 1 the system can accept sign language input to provide similar functionality to users who communicate via sign language instead of spoken words.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for automated sign language recognition comprising:
    receiving, with an input device, an input based on a plurality of hand movements and postures of a user that correspond to a sequence of signs, the receiving further comprising:
        receiving, with the input device, a first plurality of inputs corresponding to a plurality of movements of a dominant hand of the user; and
        receiving, with the input device, a second plurality of inputs corresponding to a plurality of movements of a non-dominant hand of the user;
    extracting, with a processor, a plurality of features from the input corresponding to the plurality of hand movements and postures, the extracting further comprising:
        extracting a first plurality of features corresponding to finger related (FR) features in the dominant hand from the first plurality of inputs; and
        extracting a second plurality of features corresponding to global angle (GA) features in the non-dominant hand from the second plurality of inputs;
    identifying, with the processor, a start of the sequence of signs in the input based on a first set of features in the plurality of features corresponding to the dominant hand and the non-dominant hand and a first Hidden Markov Model (HMM) stored in a memory;
    identifying, with the processor, a first sign in the input based on a second set of features in the plurality of features corresponding to the dominant hand and the non-dominant hand and a second HMM stored in the memory; and
    generating, with an output device, an output corresponding to the first sign from the input.

2. The method of claim 1 further comprising:
    identifying, with the processor, a first transition corresponding to hand movements and postures that occur between signs in the input based on a third set of features in the plurality of features corresponding to the dominant hand and the non-dominant hand and a third HMM stored in the memory;
    identifying, with the processor, a second sign in the input based on a fourth set of features in the plurality of features and the second HMM stored in the memory; and
    generating, with the output device, the output corresponding to the first sign and the second sign from the input.

3. The method of claim 2 further comprising:
    identifying, with the processor, an end of the sequence of signs in the input based on a fifth set of features in the plurality of features corresponding to the dominant hand and the non-dominant hand and the first HMM stored in the memory; and
    generating, with the output device, the output corresponding to the first sign and the second from the input after identifying the end of the sequence of signs.

4. The method of claim 1, the receiving of the input further comprising
    receiving, from a first plurality of sensors in a glove worn on the dominant hand of the user, a first set of finger position data corresponding to at least two fingers in the dominant hand of the user;
    receiving, from the first plurality of sensors in the glove worn on the dominant hand of the user, a first set of hand angle data corresponding to an angle of the dominant hand of the user; and
    receiving, from a second plurality of sensors in a glove worn on the non-dominant hand of the user, a second set of hand angle data corresponding to an angle of the non-dominant hand of the user.

5. The method of claim 4, the extraction of the first plurality of features further comprising:
    identifying, with the processor, at least one feature as a cosine distance between a first finger and a second finger in the at least two fingers of the dominant hand based on the first set of finger position data.

6. The method of claim 4, the extraction of the second plurality of features further comprising:
identifying, with the processor, a first hand angle in the first set of hand angle data generated at a first time, the first hand angle being parallel to a predetermined direction of gravity;
identifying, with the processor, a second hand angle in the first set of hand angle data generated at a second time; and
extracting, with the processor, a position of the dominant hand as a feature based on the first hand angle, the second hand angle, and a quaternion.

7. The method of claim 4, the extraction of the features further comprising:
identifying, with the processor, a first hand angle in the second set of hand angle data generated at a first time, the first hand angle being parallel to a predetermined direction of gravity;
identifying, with the processor, a second hand angle in the second set of hand angle data generated at a second time; and
extracting, with the processor, a position of the non-dominant hand as a feature in the second set of features based on the first hand angle, the second hand angle, and a quaternion.

8. The method of claim 1, the extracting of the plurality of features further comprising:
extracting the first plurality of features corresponding to both the FR features in the dominant hand and GA features of the dominant hand from the first plurality of inputs; and
extracting the second plurality of features corresponding to only the GA features in the non-dominant hand from the second plurality of inputs.

9. A system for automated sign language recognition comprising:
an input device configured to receive input corresponding to a plurality of hand movements and postures from a user corresponding to a sequence of signs;
an output device;
a memory; and
a processor operatively connected to the input device, the output device, and the memory, the processor being configured to:
receive an input from the input device based on a plurality of hand movements and postures of a user that correspond to a sequence of sign including a first plurality of inputs corresponding to a plurality of movements of a dominant hand of the user and a second plurality of inputs corresponding to a plurality of movements of a non-dominant hand of the user;
extract a plurality of features from the input corresponding to the plurality of hand movements and postures including a first plurality of features corresponding to finger related (FR) features in the dominant hand from the first plurality of inputs and a second plurality of features corresponding to global angle (GA) features in the non-dominant hand from the second plurality of inputs;
identify a start of the sequence of signs in the input based on a first set of features in the plurality of features corresponding to the dominant hand and the non-dominant hand and a first Hidden Markov Model (HMM) stored in the memory;
identify a first sign in the input based on a second set of features in the plurality of features corresponding to the dominant hand and the non-dominant hand and a second HMM stored in the memory; and
generate an output with the output device corresponding to the first sign from the input.

10. The system of claim 9, the processor being further configured to:
identify a first transition corresponding to hand movements and postures that occur between signs in the input based on a third set of features in the plurality of features corresponding to the dominant hand and the non-dominant hand and a third HMM stored in the memory;
identify a second sign in the input based on a fourth set of features in the plurality of features corresponding to the dominant hand and the non-dominant hand and the second HMM stored in the memory; and
generate the output corresponding to the first sign and the second sign from the input.

11. The system of claim 10, the processor being further configured to:
identify an end of the sequence of signs in the input based on a fifth set of features in the plurality of features corresponding to the dominant hand and the non-dominant hand and the first HMM stored in the memory; and
generate the output corresponding to the first sign and the second from the input after identifying the end of the sequence of signs.

12. The system of claim 9 the input device further comprising:
a first glove including a first plurality of sensors;
a second glove including a second plurality of sensors; and
the processor being further configured to:
receive, from the first plurality of sensors in the first glove worn on the dominant hand of the user, a first set of finger position data corresponding to at least two fingers in the dominant hand of the user;
receive, from the first plurality of sensors in the first glove worn on the dominant hand of the user, a first set of hand angle data corresponding to an angle of the dominant hand of the user; and receive, from the second plurality of sensors in the glove worn on the non-dominant hand of the user, a second set of hand angle data corresponding to an angle of the non-dominant hand of the user.

13. The system of claim 9, the processor being further configured to:
extract the first plurality of features corresponding to both the FR features in the dominant hand and GA features of the dominant hand from the first plurality of inputs; and
extract the second plurality of features corresponding to only the GA features in the non-dominant hand from the second plurality of inputs.

* * * * *

UNITED STATES PATENT AND TRADEMARK OFFICE
CERTIFICATE OF CORRECTION

PATENT NO. : 10,109,219 B2  
APPLICATION NO. : 15/099628  
DATED : October 23, 2018  
INVENTOR(S) : Zhengyu Zhou et al.

Page 1 of 1

It is certified that error appears in the above-identified patent and that said Letters Patent is hereby corrected as shown below:

On the Title Page

Item (72) should read as follows such that the second inventor's residence reads "Halver (DE)":
Inventors: Zhengyu Zhou, Fremont, CA (US);
 Tobias Menne, Halver (DE); Kehuang
 Li, Atlanta, GA (US); Kui Xu,
 Sunnyvale, CA (US); Zhe Feng,
 Mountain View, CA (US); Chin-Hui
 Lee, Atlanta, GA (US)

Signed and Sealed this
Ninth Day of April, 2019

Andrei Iancu
*Director of the United States Patent and Trademark Office*